United States Patent
Ren et al.

(10) Patent No.: US 10,928,000 B2
(45) Date of Patent: Feb. 23, 2021

(54) ELECTRIC LIFTING FRAME AND ITS CONTROL SYSTEM AND CONTROL METHOD

(71) Applicant: SHENZHEN VGOODE TECHNOLOGIES CO., LTD., Shenzhen (CN)

(72) Inventors: Huaide Ren, Anaheim, CA (US); Ying Zhang, Anaheim, CA (US); Yuan Huo, Anaheim, CA (US); Wentao Wang, Anaheim, CA (US)

(73) Assignee: SHENZHEN VGOODE TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 16/115,348

(22) Filed: Aug. 28, 2018

(65) Prior Publication Data

US 2020/0072410 A1    Mar. 5, 2020

(51) Int. Cl.
| | |
|---|---|
| *F16M 11/26* | (2006.01) |
| *A47B 9/04* | (2006.01) |
| *F16M 11/28* | (2006.01) |
| *H02P 1/02* | (2006.01) |
| *H02P 3/02* | (2006.01) |

(52) U.S. Cl.
CPC ............. *F16M 11/28* (2013.01); *A47B 9/04* (2013.01); *H02P 1/02* (2013.01); *H02P 3/02* (2013.01); *A47B 2200/0021* (2013.01); *A47B 2200/0051* (2013.01); *A47B 2220/0097* (2013.01); *F16M 2200/025* (2013.01)

(58) Field of Classification Search
CPC .. F16M 11/28; F16M 11/26; F16M 2200/025; H02P 1/02; A47B 9/04; A47B 9/043; A47B 9/046; A47B 9/00; A47B 2200/0051; A47B 2200/0021; A47B 2200/0097
USPC ...................................... 248/406.1, 157, 422
See application file for complete search history.

(56) References Cited

U.S. PATENT DOCUMENTS

| | | | |
|---|---|---|---|
| 8,631,747 B2 * | 1/2014 | Woo ....................... | F16M 11/42 108/147 |
| 10,729,233 B2 * | 8/2020 | Knudtson ................ | A47B 9/20 |
| 2006/0118682 A1 * | 6/2006 | Asquith ................. | A47B 17/02 248/188.5 |
| 2010/0301186 A1 * | 12/2010 | Chuang .................... | A47B 9/00 248/422 |

(Continued)

*Primary Examiner* — Nkeisha Smith
(74) *Attorney, Agent, or Firm* — Anova Law Group, PLLC

(57) ABSTRACT

An electric lifting frame includes a lifting pedestal and a remote control. The lifting pedestal includes a supporting base, a lifting rod detachably connected to the supporting base, and a transmission mechanism, a motor, a controller, and a power supply provided at the lifting rod. The motor is configured to effect extension and retraction of the lifting rod via the transmission mechanism. The controller is configured to control starting and stopping and a rotation direction of the motor. The power supply is configured to supply electric energy to the motor and the controller. The controller is further configured to determine a remaining capacity of the power supply and calculate a number of remaining available times of use according to the remaining capacity, a power of the motor, and a stroke of the transmission mechanism.

9 Claims, 5 Drawing Sheets

(56) References Cited

U.S. PATENT DOCUMENTS

| | | | |
|---|---|---|---|
| 2011/0079686 A1* | 4/2011 | Palik | F16M 11/046 |
| | | | 248/161 |
| 2017/0307132 A1* | 10/2017 | Kerestes | B66F 3/247 |
| 2018/0106418 A1* | 4/2018 | Anglin | F16M 13/00 |
| 2018/0177288 A1* | 6/2018 | Lin | H02K 7/06 |
| 2019/0357668 A1* | 11/2019 | Knudtson | A47B 9/20 |
| 2020/0108782 A1* | 4/2020 | MacNeille | F16M 13/02 |
| 2020/0217452 A1* | 7/2020 | Shan | F16M 11/242 |
| 2020/0221863 A1* | 7/2020 | Laing | A47B 9/00 |

\* cited by examiner

ELECTRIC LIFTING FRAME AND ITS CONTROL SYSTEM AND CONTROL METHOD

TECHNICAL FIELD OF THE PRESENT DISCLOSURE

The present disclosure relates to the technical field of office equipment, and in particular to an electric lifting frame and its control system and control method.

BACKGROUND OF THE PRESENT DISCLOSURE

Nowadays, the concept of healthy living is increasingly popular, and people's closeness to outdoors and nature has led to the increasing use of equipment such as tables, chairs and various holders from indoor environment to outdoor environment. However, most of equipment products have a fixed structure and thus are difficult to move, or their structures and applications are simple so that one product can play only one role. For example, the height of tables is not adjustable and only the usage demand in a fixed height can be satisfied. For the usage demand in various heights, various facilities with different height need to be equipped. This increases the burden and the labor to move.

The existing products such as electric lifting tables are basically considered for indoor use and usually require the use of tools for disassembly and assembly. These products occupy a large space. For few tables, their table boards can be folded to reduce the space for placement, but such tables still cannot be portable for outdoor use.

At present, there are some products with adjustable height. Most of such products need to be adjusted manually. For few lifting structures which can be adjusted electrically, their control circuits use an external structure and often require an external power supply, so they can only be used in places close to the power supply, or need to have a cable of sufficient length.

SUMMARY OF THE PRESENT DISCLOSURE

The present disclosure is aimed at solving the problems described above. An objective of the present disclosure is to provide an electric lifting frame in order to solve any one of the problems described above. Specifically, the present disclosure provides an electric lifting frame which can be portable for outdoor use and is convenient for height adjustment, and its control system and control method.

According to the first aspect of the present disclosure, the present disclosure provides an electric lifting frame, including at least one set of lifting pedestal and remote control. The lifting pedestal includes a lifting rod and a supporting base, and the lifting rod is detachably connected to the supporting base and has a retractable multi-section structure;

a transmission mechanism, a motor, a controller and a power supply are provided in the lifting rod, the motor is electrically connected to the controller and controls the extension and retraction of the lifting rod by the transmission mechanism, the power supply is used for supplying electric energy for the operation of the motor and the controller, and the controller is used for controlling starting and stopping and a rotation direction of the motor;

the controller is also used for acquiring remaining capacity in the power supply in real time and calculating remaining available times of use according to remaining capacity and power of the motor in combination with a stroke of the transmission mechanism, the remaining available times of use being the times that the remaining capacity supports the motor to drive the transmission mechanism to realize the lifting or descending of the lifting rod; and the remote control is used for pairing with the controller to control the extension and retraction of the lifting rod by the controller.

Wherein, a display is provided on the remote control, and the remote control is also used for acquiring the remaining capacity in the power supply and the remaining available times of use from the controller and displaying them in real time by the display.

Wherein, the controller includes a storage medium, a capacity management circuit, a pairing circuit, a communication circuit and a control circuit, the power of the motor, the stroke of the transmission mechanism, and a ID of the controller are stored in the storage medium;

the capacity management circuit is used for acquiring the remaining capacity in the power supply in real time and calculating the remaining available times of use according to the remaining capacity and the power of the motor in combination with the stroke of the transmission mechanism;

the pairing circuit is used for pairing with the remote control;

the communication circuit is used for receiving pairing information of the remote control which including the ID of the remote control, and sending response information including the ID of the controller to the remote control, and is also used for sending the remaining capacity and the remaining available times of use to the paired remote control; and the control circuit is used for identifying the ID of the remote control carried in the pairing information and controlling the communication circuit to send the response information to the remote control.

Wherein, when the electric lifting frame includes two or more sets of the lifting pedestals and the remote controls, one of the remote controls is selected as a primary remote control and a controller in the lifting rod originally paired with the primary remote control is used as a primary controller, and the other remote controls in the electric lifting frame are used as secondary remote controls and controllers in the lifting rod originally paired with the secondary remote controls are used as secondary controllers;

the primary remote control sends pairing invitation information carrying the ID of the primary remote control, identifies the ID of the secondary controller paired with the secondary remote control carried in confirmation information after receiving the confirmation information of the secondary remote control, and then is paired with the secondary controller; and after the pairing is finished, the primary remote control can simultaneously control lifting or descending of each of the lifting pedestals in the electric lifting frame.

Wherein, the simultaneously controlling lifting or descending of each of the lifting pedestals in the electric lifting frame includes:

by the primary remote control, sending, to the primary controller and the secondary controller, a lifting or descending command, and receiving, from the primary controller, height change information of the lifting or descending of the lifting rod under the control of the primary controller, the height change information being the transmission stroke of the transmission mechanism and/or the rotation turns of the motor after this command;

then sending the height change information to the secondary controller and receiving height error information fed back by the secondary controller; controlling, according to the height error information, a stroke error of the lifting or descending of the lifting rod under the control of the primary controller and the secondary controller not to exceed a set value; and sending, by the primary remote control and to the primary controller and the secondary controller, a stop command when the height change information reaches a preset adjustment height.

Wherein, controlling, according to the height error information, a stroke error of the lifting or descending of the lifting rod under the control of the primary controller and the secondary controller not to exceed a set value includes:

sending, by the primary remote control, a speedup or slowdown command to the primary controller and simultaneously sending a slowdown or speedup command to the secondary controller when the primary remote control determines that the height error information exceeds a first preset error value; and sending, by the primary remote control, a stop command to the primary controller or the secondary controller when the primary remote control determines that the height error information exceeds a second preset error value;

wherein, the first preset error value is less than the second preset error value.

Wherein, the controller is also used for acquiring load weight borne by the lifting rod in real time and controlling a rotation speed of the motor according to the load weight.

Wherein, the transmission mechanism includes a screw rod and a push rod, a first end of the screw rod is fixedly connected to an output end of the motor and a second end of the screw rod is in transmission connection to a first end of the push rod, and a second end of the push rod is fixedly connected to a top end of the lifting rod; and the motor enables the spiral transmission between the screw rod and the push rod by driving the screw rod to rotate, and controls the push rod to drive the lifting rod to lift or descend.

Wherein, each of the lifting pedestals is also provided with a locking mechanism, and the top end of the lifting rod is fixedly connected to an apparatus to be lifted or descended by the locking mechanism;

the locking mechanism includes a fixation frame, a bolt, a pull ring and an elastic member, the fixation frame is fixed on the bottom of the apparatus to be lifted or descended, the bolt is in sliding connection to the fixation frame and one end of the bolt is fixedly connected to the pull ring and the other end of the bolt is in sliding connection to the top end of the lifting rod, and the pull ring is elastically connected to the fixation frame by the elastic member; and pulling the pull ring can control the bolt to separate from the top end of the lifting rod.

According to another aspect of the present disclosure, the present disclosure further provides a control system for an electric lifting frame, including at least one set of control assembly. The control assembly includes a remote control, a controller, a power supply and a motor, the power supply is used for supplying electric energy for the operation of the motor and the controller;

the controller is used for controlling starting and stopping and a rotation direction of the motor; the controller is also used for acquiring remaining capacity in the power supply in real time and calculating the remaining available times of use according to the remaining capacity and a power of the motor in combination with a stroke of a transmission mechanism of the electric lifting frame, the remaining available times of use being the times that the remaining capacity supports the motor to drive the transmission mechanism to realize the lifting or descending of the lifting rod; and the remote control is used for pairing with the controller to control the operation of the motor by the controller.

Wherein, the remote control is also used for acquiring the remaining capacity in the power supply and the remaining available times of use from the controller and displaying them in real time.

Wherein, the controller includes a storage medium, a capacity management circuit, a pairing circuit, a communication circuit and a control circuit, the power of the motor, the stroke of the transmission mechanism, and the ID of the controller are stored in the storage medium;

the capacity management circuit is used for acquiring the remaining capacity in the power supply in real time and calculating the remaining available times of use according to the remaining capacity and the power of the motor in combination with the stroke of the transmission mechanism;

the pairing circuit is used for pairing with the remote control;

the communication circuit is used for receiving pairing information of the remote control which including the ID of the remote control, and sending response information including the ID of the controller to the remote control, and is also used for sending the remaining capacity and the remaining available times of use to the paired remote control; and the control circuit is used for identifying the ID of the remote control carried in the pairing information and controlling the communication circuit to send the response information to the remote control.

Wherein, when the control system includes two or more sets of the control assemblies, one of the remote controls is selected as a primary remote control and a controller originally paired with the primary remote control is used as a primary controller, and the other remote controls in the control system are used as secondary remote controls and controllers originally paired with the secondary remote controls are used as secondary controllers;

the primary remote control sends pairing invitation information carrying the ID of the primary remote control, identifies the ID of the secondary controller paired with the secondary remote control carried in confirmation information after receiving the confirmation information of the secondary remote control, and then performs the pairing; and after the pairing is finished, the primary remote control can simultaneously control the operation of each of the motors in the control system.

Wherein, the simultaneously controlling the operation of each of the motors in the control system includes:

by the primary remote control, sending, to the primary controller and the secondary controller, a lifting or descending command, and receiving, from the primary controller, height change information under the control of the primary controller; then sending the height change information to the secondary controller and receiving height error information fed back by the secondary controller; controlling, according to the height error information, a stroke error of the lifting or descending under the control of the primary controller and the secondary controller not to exceed a set value; and sending, by the primary remote control and to the primary controller and the secondary controller, a stop command when the height change information reaches a preset adjustment height.

Wherein, controlling, according to the height error information, a stroke error of the lifting or descending under the control of the primary controller and the secondary controller not to exceed a set value includes:

sending, by the primary remote control, a speedup or slowdown command to the primary controller and simultaneously sending a slowdown or speedup command to the secondary controller when the primary remote control determines that the height error information exceeds a first preset error value; and sending, by the primary remote control, a stop command to the primary controller or the secondary controller when the primary remote control determines that the height error information exceeds a second preset error value;

wherein, the first preset error value is less than the second preset error value.

In addition, the present disclosure further provides a control method for an electric lifting frame, including: controlling the starting and stopping and the rotation direction of a motor according to a command from a remote control after a controller and the remote control are paired; and simultaneously, by the controller, acquiring remaining capacity in a power supply in real time and calculating the remaining available times of use according to the remaining capacity and the power of the motor in combination with the stroke of a transmission mechanism of the electric lifting frame, the remaining available times of use being the times that the remaining capacity supports the motor to drive the transmission mechanism to realize the lifting or descending.

Wherein, the controller includes a storage medium, a capacity management circuit, a pairing circuit, a communication circuit and a control circuit, and the power of the motor, the stroke of the transmission mechanism, and the ID of the controller are stored in the storage medium;

the control method further includes:

by the control circuit, controlling the capacity management circuit to acquire the remaining capacity in the power supply in real time and calculating the remaining available times of use according to the remaining capacity and the power of the motor in combination with the stroke of the transmission mechanism;

by the control circuit, identifying the ID of the remote control carried in pairing information and controlling the communication circuit to send response information to the remote control after the communication circuit receives the pairing information of the remote control; and by the control circuit, controlling the communication circuit to send the remaining capacity and the remaining available times of use to the remote control after the pairing circuit finishes the pairing with the remote control.

Wherein, one of the remote controls is selected as a primary remote control and a controller originally paired with the primary remote control is used as a primary controller, and the other remote controls in the control system are used as secondary remote controls and controllers originally paired with the secondary remote controls are used as secondary controllers;

the control method further includes:

by the primary remote control, sending pairing invitation information carrying the ID of the primary remote control, identifying the ID of the secondary controller paired with the secondary remote control carried in confirmation information after receiving the confirmation information of the secondary remote control, and then performing the pairing; and then simultaneously controlling the operation of each of the motors in the electric lifting frame by the primary remote control.

Wherein, the simultaneously controlling the operation of each of the motors in the electric lifting frame includes:

by the primary remote control, sending, to the primary controller and the secondary controller, a lifting or descending command, and receiving, from the primary controller, height change information under the control of the primary controller; then sending the height change information to the secondary controller and receiving height error information fed back by the secondary controller; controlling, according to the height error information, a stroke error of the lifting or descending under the control of the primary controller and the secondary controller not to exceed a set value; and sending, by the primary remote control and to the primary controller and the secondary controller, a stop command when the height change information reaches a preset adjustment height.

Wherein, controlling, according to the height error information, a stroke error of the lifting or descending under the control of the primary controller and the secondary controller not to exceed a set value includes:

sending, by the primary remote control, a speedup or slowdown command to the primary controller and simultaneously sending a slowdown or speedup command to the secondary controller when the primary remote control determines that the height error information exceeds a first preset error value; and sending, by the primary remote control, a stop command to the primary controller or the secondary controller when the primary remote control determines that the height error information exceeds a second preset error value;

wherein, the first preset error value is less than the second preset error value.

The electric lifting frame of the present disclosure has the advantages of simple structure, convenient assembly and disassembly, and portability. Also, by providing the motor and a remote-control receiver in the lifting rod, the remote-control automatic lifting and descending can be realized, and the remaining capacity and the remaining available times of use can be displayed in real time. The electric lifting frame has wide applicability, can be used indoors and can also meet demands in various outdoor applications.

Other characteristics, features and advantages of the present disclosure will become clearer by reading the following description of exemplary embodiments with reference to the drawings.

BRIEF DESCRIPTION OF THE DRAWINGS

The drawings incorporated into the description and constituting a part of the description show the embodiments of the present disclosure, and are used for explaining the principle of the present disclosure in combination with the description. In these drawings, similar reference numerals represent similar elements. The drawings described hereinafter show some but not all of the embodiments of the present disclosure. A person of ordinary skill in the art can obtain other drawings according to these drawings without any creative effort.

DETAILED DESCRIPTION OF THE EMBODIMENTS

To make the objectives, technical solutions and advantages of the embodiments of the present disclosure clearer, the technical solutions in the embodiments of the present disclosure will be described in conjunction with the drawings in the embodiments of the present disclosure. Apparently, the described embodiments are some but not all of the embodiments of the present disclosure. All other embodiments obtained by a person of ordinary skill in the art without any creative effort on the basis of the embodiments in the present disclosure shall fall into the scope of the present disclosure. It is to be noted that, the embodiments in the present application and the features in the embodiments can be combined at will so long as there is no conflict.

The invertors of the present disclosure design an electric lifting frame which has the advantages of simple structure, convenient assembly and disassembly, and portability. The electric lifting frame is applied to various occasions. For example, the electric lifting frame can be used separately or multiple sets of electric lifting frames can be used in combination. Also, the electric lifting frame can be remotely controlled via a remote control, and the remaining capacity and the remaining available times of use can be obtained in real time in order to supplement electric energy timely or take other measures to ensure the smooth use of the electric lifting frame, so that various demands of users are satisfied.

The electric lifting frame and its control system and control method of the present disclosure will be described below in detail with reference to the drawings.

Figure 1:
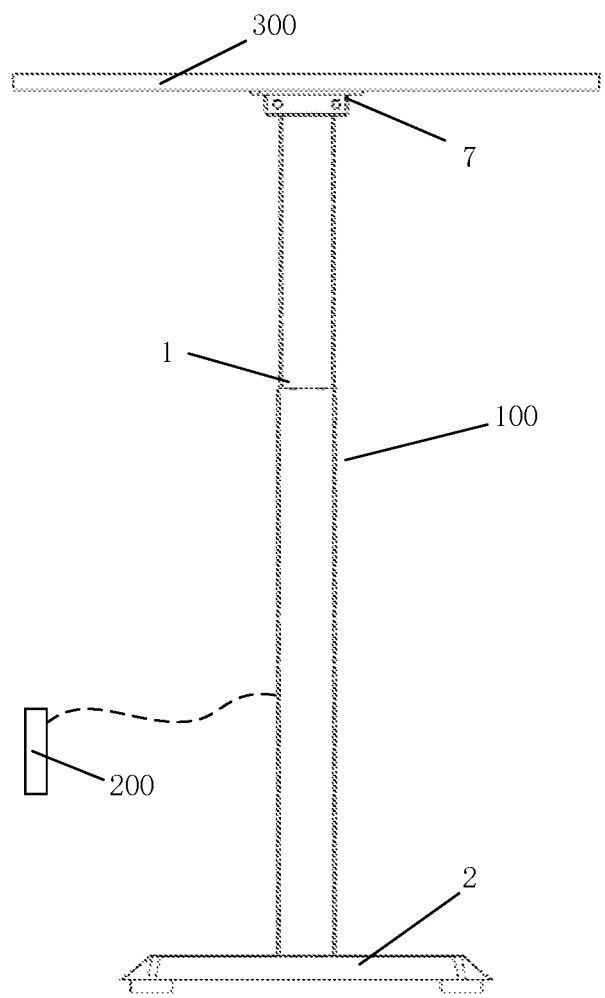
FIG. 1 exemplarily shows a structural diagram of an electric lifting frame according to the present disclosure.

First, the present disclosure provides an electric lifting frame. FIG. 1 shows a hardware structure diagram of the electric lifting frame. Referring to FIG. 1, the electric lifting frame includes at least one set of lifting pedestal 100 and remote control 200, the lifting pedestal 100 includes a lifting rod 1 and a supporting base 2, and the lifting rod 1 is detachably connected to the supporting base 2 and has a retractable multi-section structure. The supporting base 2 is used to fix and support the lifting rod 1. After a top end of the lifting rod 1 is fixedly connected to a table board or mesa 300, the height of the table board or mesa 300 is adjusted by the extension and retraction of the lifting rod 1. In the embodiment shown in FIG. 1, the electric lifting frame includes one set of paired lifting pedestal 100 and remote control 200, wherein, the lifting pedestal 100 is fixedly connected to the table board or mesa 300 to be lifted or descended, and the extension and retraction of the lifting rod 1 is controlled by the remote control 200, thus to adjust the height of the table board or mesa 300. In another typical embodiment, multiple lifting pedestals 100 can be respectively fixed on the bottom of a single large mesa 300, and each lifting pedestal 100 is provided with one remote control 200. Multiple remote controls 200 can simultaneously control the lifting or descending of the mesa 300 to adjust the height of the mesa 300, or one of multiple remote controls 200 can be paired with all lifting pedestals 100 to perform synchronous remote controlling.

Figure 2:
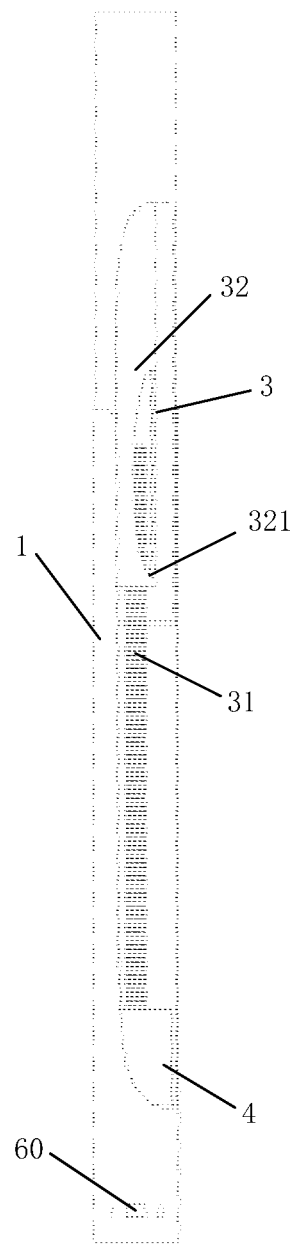
FIG. 2 exemplarily shows an internal structure diagram of a lifting rod according to the present disclosure.

FIG. 2 shows an internal structure diagram of a lifting rod 1 in one specific embodiment of the lifting pedestal 100. Referring to FIG. 2, a transmission mechanism 3, a motor 4, a controller 5 and a power supply 6 are provided in the lifting rod 1; the motor 4 is electrically connected to the controller 5 and controls the extension and retraction of the lifting rod 1 by the transmission mechanism 3, and the power supply 6 is used for supplying electric energy for the operation of the motor 4 and the controller 5; and the controller 5 is used for controlling the starting and stopping and the rotation direction of the motor 4, thus controlling the transmission mechanism 3 to drive the extension and retraction of the lifting rod 1, so that the position of the mesa 300 is lifted or descended.

In the electric lifting frame of the present disclosure, the controller 5 is also used for acquiring remaining capacity in the power supply 6 in real time and calculating the remaining available times of use according to the remaining capacity and the power of the motor 4 in combination with parameters such as the stroke of the transmission mechanism 3, the remaining available times of use being the times that the current remaining capacity in the power supply 6 supports the motor 4 to drive the transmission mechanism 3 to realize the lifting or descending of the lifting rod 1 within the whole stroke. The remaining capacity is converted into the remaining available times of use, which is then intuitively displayed. It is convenient for the user's observation and management before or during the use, so that the user can charge the electric lifting frame timely in the case of out of power to ensure the smooth use.

Figure 3:
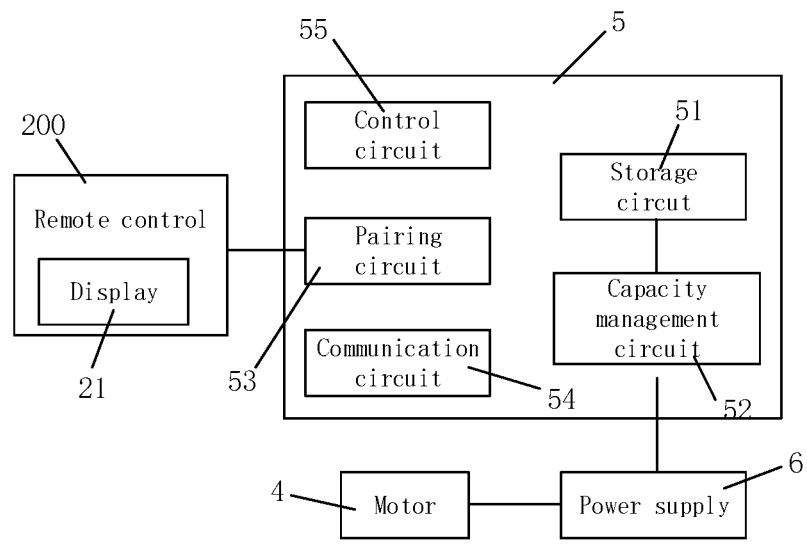
FIG. 3 exemplarily shows a diagram of a control system of the electric lifting frame according to the present disclosure.

FIG. 3 shows a diagram of a control system in one specific embodiment of the electric lifting frame according to the present disclosure. Referring to FIG. 3, the remote control 200 is used for pairing with the controller 5 and controlling the extension and retraction of the lifting rod 1 by the controller 5. The user can remotely control the lifting or descending of the electric lifting frame by the remote control 200, and it is particularly useful in outdoor environment with large space.

In this embodiment, a display 21 is provided on the remote control 200. The remote control 200 is also used for acquiring the remaining capacity in the power supply 6 and the remaining available times of use from the controller 5 and displaying them in real time by the display 21, and can give an alarm when the remaining capacity is lower than a preset value or the remaining available times of use is less than a preset times to prompt the user to prepare early or take other measures.

Specifically, the controller 5 includes a storage medium 51, a capacity management circuit 52, a pairing circuit 53, a communication circuit 54 and a control circuit 55. Wherein, the storage medium 51 stores parameters and information such as the power of the motor 4, the stroke of the transmission mechanism 3, and the identification (ID) of the controller 5, for example, can also store other detailed transmission parameters in the transmission mechanism 3 and the load limit of the lifting rod 1;

the capacity management circuit 52 is used for acquiring the remaining capacity in the power supply 6 in real time, and calculating the remaining available times of use that the current remaining capacity supports the motor 4 to operate within the stroke limit of the transmission mechanism 3 according to the remaining capacity and the power of the motor 4 in combination with the stroke of the transmission mechanism 3;

the pairing circuit 53 is used for pairing with the remote control 200;

the communication circuit 54 is used for receiving pairing information of the remote control 200, the pairing information including the ID of the remote control 200, and sending response information including the ID of the controller 5 to the remote control 200, and is also used for sending the remaining capacity and the remaining available times of use to the paired remote control 200; and the control circuit 55 is used for identifying the ID of the remote control 200 carried in the pairing information and controlling the communication circuit 54 to send the response information to the remote control 200.

In another typical embodiment, the electric lifting frame of the present disclosure can include two or more sets of lifting pedestals 100 and remote controls 200. In this case, multiple lifting pedestals 100 can be respectively lifted or descended by multiple remote controls 200 simultaneously, or all lifting pedestals 100 can be synchronously lifted or descended by one of the remote controls 200.

In this case, one of the remote controls 200 can be selected as a primary remote control and a controller 5 in the lifting rod 1 originally paired with the primary remote control is used as a primary controller, and the other remote controls 200 in the electric lifting frame are used as secondary remote controls and controllers 5 in the lifting rods 1 originally paired with the secondary remote controls are used as secondary controllers.

After the primary remote control is selected, the primary remote control sends pairing invitation information carrying the ID of the primary remote control, identifies the ID of the secondary controller paired with the secondary remote control carried in conformation information after receiving the confirmation information of the secondary remote control, and then is paired with the secondary controller, that is, the primary remote control is paired with all secondary controllers responding with the confirmation information. The confirmation information responding to the pairing invitation information sent by the primary remote control can be sent by the user through the secondary remote control, or can be automatically sent by the secondary controller under a preset condition. For example, the secondary controller sends the confirmation information carrying the ID of the secondary controller to the primary remote control after continuously receiving the pairing invitation information sent by a same primary remote control twice or more times.

After the pairing is finished, the primary remote control can simultaneously control the lifting or descending of each of the lifting pedestals 100 in the electric lifting frame.

In a typical embodiment, the simultaneously controlling the lifting or descending of each of the lifting pedestals 100 in the electric lifting frame by the primary remote control including:

by the primary remote control, sending, to the primary controller and the secondary controller, a lifting or descending command, and receiving, from the primary controller, height change information of the lifting or descending of the lifting rod 1 under the control of the primary controller, the height change information being the transmission stroke of the transmission mechanism 3 and/or the rotation turns of the motor 4 after this command;

then sending the height change information to the secondary controller and receiving height error information fed back by the secondary controller; controlling, according to the height error information, a stroke error of the lifting or descending of the lifting rod under the control of the primary controller and the secondary controller not to exceed a set value; and sending, by the primary remote control to the primary controller and the secondary controller, a stop command when the height change information reaches a preset adjustment height.

Specifically, the controlling, by the primary remote control and according to the height error information, a stroke error of the lifting or descending of the lifting rod under the control of the primary controller and the secondary controller not to exceed a set value can comprise:

sending, by the primary remote control, a speedup or slowdown command to the primary controller and simultaneously sending a slowdown or speedup command to the secondary controller when the primary remote control determines that the height error information exceeds a first preset error value; and sending, by the primary remote control, a stop command to the primary controller or the secondary controller when the primary remote control determines that the height error information exceeds a second preset error value; wherein, the first preset error value is less than the second preset error value. When the primary remote control determines that the height error information doesn't exceed the first preset error value, no speedup or slowdown command is sent, and the primary controller and each secondary controller operate normally.

For example, when the primary remote control controls multiple lifting rods to lift simultaneously, the primary remote control simultaneously sends a lifting command to the primary controller and the secondary controller, and then receives the height change information of the lifting of the lifting rod 1 under the control of the primary controller, which is sent by the primary controller. For example, the primary controller can calculate the transmission stroke according to the rotation turns of the motor and the transmission stroke in a signal turn of the transmission mechanism. In this way, the lifting height of the lifting rod 1 can be obtained. The primary remote control receives the height change information and sends it to each secondary controller, and each secondary controller compares the height change information with the lifting height of the lifting rod under the control of the secondary controller to obtain the height error information and feeds back the height error information to the primary remote control.

When the primary remote control determines that the absolute value of the height error information exceeds the second preset error value after receiving the height error information, if the height error information is a positive value (the height change information under the control of the primary controller is greater than the height change information under the control of the secondary controller), the primary remote control sends a stop command to the primary controller and then receives the height error information sent by the secondary controller again, and when it determines that the height error information is zero, the primary remote control sends a stop command to the secondary controller. On the contrary, if the height error information, received by the primary remote control, which exceeds the second preset error value, is a negative value (the height change information under the control of the primary controller is less than the height change information under the control of the secondary controller), the primary remote control sends a stop command to the secondary controller, sends a height change information to the secondary controller for comparison after receiving the height change information sent by the primary controller again, and receives the height error information sent by the secondary controller. The primary remote control sends a stop command to the primary controller when the height error information received again is zero. After the adjustment described above, the user sends a lifting command again by the primary remote control according to the difference between the current height of the electric lifting frame and the expected height. The above steps are repeated, when the height change information received by the primary remote control reaches the preset adjustment height, the primary remote control sends a stop command to the primary controller and each secondary controller.

When the primary remote control determines that the absolute value of the height error information is less than the second preset error value after receiving the height error information, compares the height error information with the first preset error value. If the height error information is less than the first preset error value, no command is sent, and the height change information sent by the primary controller and the height error information sent by the secondary remote control are continuously received by the primary remote control. When the absolute value of the height error information is less than the second preset error value and greater than the first preset error value, if the height error information is a positive value (the height change information under the control of the primary controller is greater than the height change information under the control of the secondary controller), the primary remote control sends a slowdown command to the primary controller and/or sends a speedup command to the secondary controller; if the height error information is a negative value (the height change information under the control of the primary controller is less than the height change information under the control of the secondary controller), the primary remote control sends a speedup command to the primary controller and/or sends a slowdown command to the secondary controller. The above steps are repeated, when the height change information received by the primary remote control reaches the preset adjustment height, the primary remote control sends a stop command to the primary controller and each secondary controller.

When multiple lifting rods 1 are controlled to descend simultaneously by the primary remote control, the control process is the same as the process of controlling the multiple lifting rods 1 to lift.

In another typical embodiment, the controller 5 can also be used for acquiring load weight borne by the lifting rod 1 in real time and controlling the rotation speed of the motor 4 according to the load weight. This is particularly applied to a situation where the mesa 300 is controlled to lift or descend by one set of lifting pedestal 100 and remote control 200.

Returning to FIG. 2, in this embodiment, the transmission mechanism 3 includes a screw rod 31 and a push rod 32, a first end of the screw rod 31 is fixedly connected to an output end of the motor 4 and a second end of the screw rod 31 is in transmission connection to a first end of the push rod 32, and a second end of the push rod 32 is fixedly connected to the top end of the lifting rod 1. The motor 4 enables the spiral transmission between the screw rod 31 and the push rod 32 by driving the screw rod 31 to rotate, and controls the push rod 32 to drive the lifting rod 1 to lift or descend and thus adjusts the height of the lifting rod 1 to realize the adjustment of the height of the table board or mesa 300. Specifically, a nut 321 can be embedded in a first end of the push rod 32 and the push rod 32 is in spiral transmission connection to the screw rod 31 by the nut 321.

In order to facilitate the disassembly and assembly between the lifting pedestal 100 and the mesa 300 to be lifted or descended, each of the lifting pedestals 100 is also provided with a locking mechanism 7, and the top end of the lifting rod 1 is fixedly connected to the apparatus to be lifted or descended by the locking mechanism 7.

Figure 4:
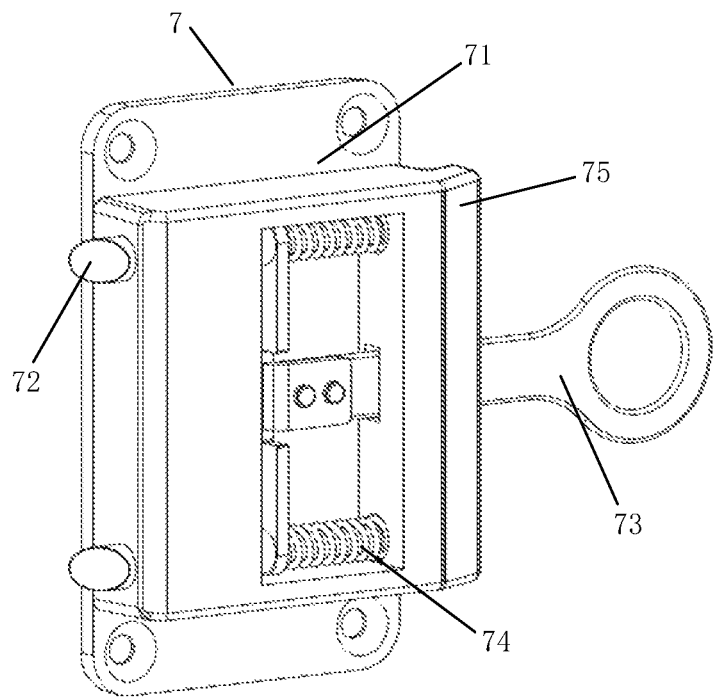
FIG. 4 exemplarily shows a structural diagram of a locking mechanism according to the present disclosure.

FIG. 4 shows a structural diagram of one specific embodiment of the locking mechanism 7. Referring to FIG. 4, the locking mechanism 7 includes a fixation frame 71, a bolt 72, a pull ring 73 and an elastic member 74, the mounting position of the lifting rod 1 is fixed by the position of the fixation frame 71, the lifting rod 1 is fixed by the bolt 72, and quick disassembly is realized by pulling the pull ring 73. Specifically, the fixation frame 71 is fixed on the bottom of the apparatus to be lifted or descended, the bolt 72 is in sliding connection to the fixation frame 71, and one end of the bolt 72 is fixedly connected to the pull ring 73 and the other end of the bolt 72 is in sliding connection to the top end of the lifting rod 1. The pull ring 73 is elastically connected to the fixation frame 71 by the elastic member 74, and the pull ring 73 can drive the bolt 72 to slide on the fixation frame 71 or return to the original position by the elastic member 74. Pulling the pull ring 73 and compressing the elastic member 74 can control the bolt 72 to separate from the top end of the lifting rod 1. Exemplarily, the elastic member 74 can be a spring, for example, can be a compressed spring or a tension spring.

Figure 5:
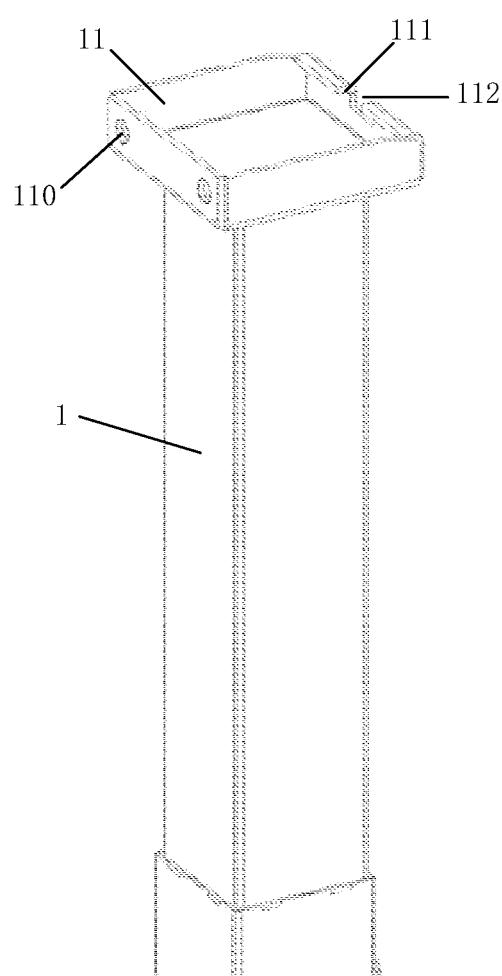
FIG. 5 exemplarily shows a structural diagram of a top end of the lifting rod according to the present disclosure.
Figure 6:
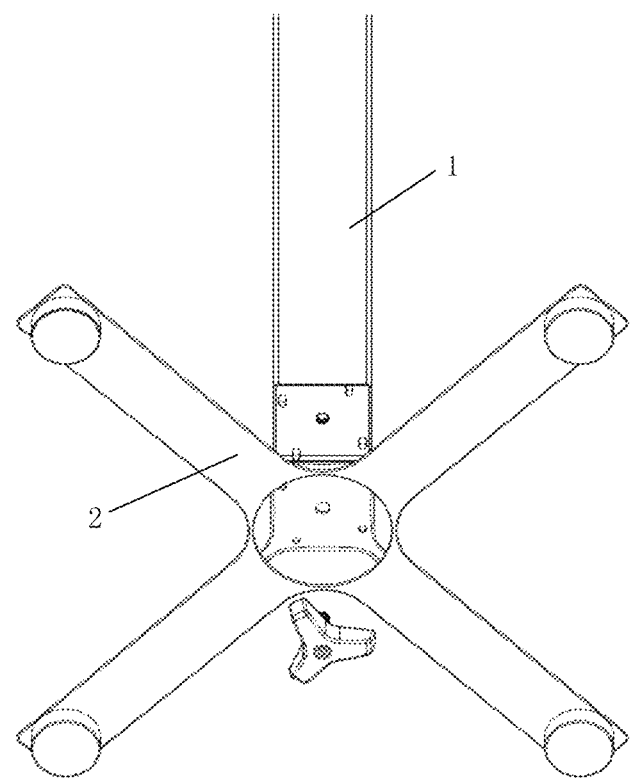
FIG. 6 exemplarily shows a diagram of the connection of the lifting rod with a supporting base according to the present disclosure.

FIG. 5 shows a structural diagram of a top end of a lifting rod 1 matched with the locking mechanism. In this embodiment, a mounting groove 11 matched with the fixation frame 71 is provided on the top end of the lifting rod 1, and the shape and size of the mounting groove 11 are adapted to the shape and size of the fixation frame 71. As shown in FIG. 4, a bending structure 75 is provided on a first end of the fixation frame 71 where the pull ring 73 is mounted, and the bolt is arranged to pass through a second end of the fixation frame 71. In the mounting groove 11 shown in FIG. 5, a trench 111 is provided at a first side and a gap 112 is provided in the middle of the trench 111, and a fixation hole 110 is provided at a second side of the mounting groove 11. During the mounting, the mounting groove 11 is buckled on the fixation frame 71, the trench 111 is hitched on the bending structure 75, the pull ring 73 passes through the gap 112, and the bolt 72 is snapped in the fixation hole 110.

Specifically, a slope is provided at an end portion of the bolt 72 and the slope is arranged towards the lifting rod 1. When the lifting rod 1 is mounted, the slope can be squeezed by the mounting groove 11 and the bolt 72 is pushed to drive the pull ring 73 to compress the elastic member 74. After the lifting rod 1 is mounted in place, the bolt 72 passes through the fixation hole 110 and goes out due to the elastic resilience of the elastic member 74, the mounting groove 11 and the fixation frame 71 are locked, and thus the lifting rod 1 is fixedly connected to the mesa 300.

In addition to the electric lifting frame, the present disclosure further provides a control system for the electric lifting frame. Specifically, the control system includes at least one set of control assembly, and each set of control assembly includes a remote control 200, a controller 5, a power supply 6 and a motor 4.

Wherein, the power supply 6 is used for supplying electric energy for the operation of the motor 4 and the controller 5;

the controller 5 is used for controlling the starting and stopping and the rotation direction of the motor 4, and is also used for acquiring remaining capacity in the power supply 6 in real time and calculating the remaining available times of use according to the remaining capacity and the power of the motor 4 in combination with the stroke of the transmission mechanism 3 of the electric lifting frame, the remaining available times of use being the times that the current remaining capacity in the power supply 6 supports the motor 4 to drive the transmission mechanism 3 to realize the lifting or descending of the lifting rod 1 within the whole stroke; and the remote control 200 is used for pairing with the controller 5 to control the operation of the motor 4 by means of the controller 5.

In addition, the remote control 200 is also used for acquiring the remaining capacity in the power supply 6 and the remaining available times of use from the controller 5 and displaying them in real time.

Returning to FIG. 3, the controller 5 includes a storage medium 51, a capacity management circuit 52, a pairing circuit 53, a communication circuit 54 and a control circuit 55, wherein, the storage medium 51 stores parameters and information such as the power of the motor 4, the stroke of the transmission mechanism 3, and the ID of the controller 5, for example, can also store other detailed transmission parameters in the transmission mechanism 3 and the load limit of the lifting rod 1;

the capacity management circuit 52 is used for acquiring the remaining capacity in the power supply 6 in real time, and calculating the remaining available times of use that the current remaining capacity in the power supply 6 supports the motor 4 to operate within the stroke limit of the transmission mechanism 3 according to the remaining capacity and the power of the motor 4 in combination with the stroke of the transmission mechanism 3;

the pairing circuit 53 is used for pairing with the remote control 200;

the communication circuit 54 is used for receiving pairing information of the remote control 200, the pairing information including the ID of the remote control 200, and sending response information including the ID of the controller 5 to the remote control 200, and is also used for sending the remaining capacity and the remaining available times of use to the paired remote control 200; and the control circuit 55 is used for identifying the ID of the remote control 200 carried in the pairing information and controlling the communication circuit 54 to send the response information to the remote control 200.

When the control system includes one set of the above control assembly, in the control process, it is only required to send a corresponding command to the controller 5 by the remote control 200. However, the control system of the present disclosure can also comprise multiple sets of control assemblies, and the control process in this case is more complex.

Specifically, when the control system includes two or more sets of control assemblies, one of the remote controls 200 needs to be selected as a primary remote control and a controller 5 originally paired with the primary remote control is used as a primary controller, and the other remote controls 200 in the control system are used as secondary remote controls and controllers 5 originally paired with the secondary remote controls is used as secondary controllers.

After the primary remote control is selected, the primary remote control sends pairing invitation information carrying the ID of the primary remote control, identifies the ID of the secondary controller paired with the secondary remote control carried in conformation information after receiving the confirmation information of the secondary remote control, and then is paired with the secondary controller. By this way, the primary remote control is paired with all secondary controllers responding with the confirmation information.

After the pairing is finished, the primary remote control can simultaneously control the operation of motors 4 in multiple control assemblies of the control system.

Specifically, simultaneously controlling the operation of each of the motors 4 in the control system of the electric lifting frame by the primary remote control can include:

by the primary remote control, sending, to the primary controller and the secondary controller, a lifting or descending command, and receiving, from the primary controller, height change information under the control of the primary controller; then sending the height change information to the secondary controller and receiving height error information fed back by the secondary controller; controlling, according to the height error information, a stroke error of the lifting or descending under the control of the primary controller and the secondary controller not to exceed a set value; and sending, by the primary remote control and to the primary controller and the secondary controller, a stop command when the height change information reaches a preset adjustment height.

Specifically, the controlling, by the primary remote control and according to the height error information, a stroke error of the lifting or descending under the control of the primary controller and the secondary controller not to exceed a set value includes:

sending, by the primary remote control, a speedup or slowdown command to the primary controller and simultaneously sending a slowdown or speedup command to the secondary controller when the primary remote control determines that the height error information exceeds a first preset error value; and sending, by the primary remote control, a stop command to the primary controller or the secondary controller when the primary remote control determines that the height error information exceeds a second preset error value; wherein, the first preset error value is less than the second preset error value. When the primary remote control determines that the height error information doesn't exceed the first preset error value, the speedup or slowdown command will not be sent, and the primary controller and each secondary controller operate normally.

Corresponding to the control system, the present disclosure further provides a control method for an electric lifting frame, including: controlling the starting and stopping and the rotation direction of a motor 4 according to a command from a remote control 200 by a controller 5 after the controller 5 and the remote control 200 are paired; and in the meantime, by the controller 5, acquiring remaining capacity in a power supply 6 in real time and calculating the remaining available times of use according to the remaining capacity and the power of the motor 4 in combination with the stroke of a transmission mechanism 3 of the electric lifting frame, the remaining available times of use being the times that the remaining capacity supports the motor 4 to drive the transmission mechanism 3 to realize the lifting or descending.

In a typical embodiment, the controller 5 can also acquire load weight borne by the lifting rod 1 in real time and control the rotation speed of the motor 4 according to the load weight, that is, control the lifting and descending speed of the electric lifting frame.

Specifically, the controller 5 includes a storage medium 51, a capacity management circuit 52, a pairing circuit 53, a communication circuit 54 and a control circuit 55; the storage medium 51 stores parameters and information such as the power of the motor 4, the stroke of the transmission mechanism 3, and the ID of the controller 5, for example, the storage medium 51 can also store other detailed transmission parameters in the transmission mechanism 3 and the load limit of the lifting rod 1.

The control method of the present disclosure further includes the following steps:

by the control circuit 55, controlling the capacity management circuit to acquire the remaining capacity in the power supply 6 in real time, and calculating the remaining available times of use that the current remaining capacity supports the motor 4 to operate within the stroke limit of the transmission mechanism 3 according to the remaining capacity and the power of the motor 4 in combination with the stroke of the transmission mechanism 3;

by the control circuit 55, identifying the ID of the remote control 200 carried in pairing information after the communication circuit 54 receives the pairing information from the remote control 200 and controlling the communication circuit 54 to send response information to the remote control 200; and by the control circuit 55, controlling the communication circuit 54 to send the remaining capacity and the remaining available times of use to the remote control 200 after the pairing circuit 53 finishes the pairing with the remote control 200.

When the electric lifting frame includes two or more sets of lifting pedestals 100 and remote controls 200, one of the remote controls 200 is selected as a primary remote control and a controller 5 originally paired with the primary remote control is used as a primary controller, and the other remote controls 200 in the control system are used as secondary remote controls and controllers 5 originally paired with the secondary remote controls are used as a secondary controllers. In this case, the control method of the present disclosure can further include the following steps:

by the primary remote control, sending pairing invitation information carrying the ID of the primary remote control, identifying the ID of the secondary controller paired with the secondary remote control carried in confirmation information after receiving the confirmation information of the secondary remote control, and then pairing with the secondary controller; and then simultaneously controlling the operation of each of the motors 4 in the electric lifting frame by the primary remote control. In the pairing process, the confirmation information responding to the pairing invitation information from the primary remote control can be sent by the user by means of the secondary remote control, and can also be automatically sent by the secondary controller under a preset condition. For example, the secondary controller can automatically send the confirmation information carrying the ID of the secondary controller to the primary remote control after continuously receiving the pairing invitation information sent by a same primary remote control twice or more times. In this way, the failed pairing caused when the secondary remote control is not around or the secondary remote control is breakdown can be effectively avoided.

Specifically, simultaneously controlling the operation of each of the motors 4 in the electric lifting frame by the primary remote control includes the following steps:

by the primary remote control, sending, to the primary controller and the secondary controller, a lifting or descending command, and receiving, from the primary controller, height change information under the control of the primary controller; then sending the height change information to the secondary controller and receiving height error information fed back by the secondary controller; controlling, according to the height error information, a stroke error of the lifting or descending under the control of the primary controller and the secondary controller not to exceed a set value; and sending, by the primary remote control and to the primary controller and the secondary controller, a stop command when the height change information reaches a preset adjustment height.

Wherein, controlling, by the primary remote control and according to the height error information, a stroke error of the lifting or descending under the control of the primary controller and the secondary controller not to exceed a set value includes:

sending, by the primary remote control, a speedup or slowdown command to the primary controller and simultaneously sending a slowdown or speedup command to the secondary controller when the primary remote control determines that the height error information exceeds a first preset error value; and sending, by the primary remote control, a stop command to the primary controller or the secondary controller when the primary remote control determines that the height error information exceeds a second preset error value;

wherein, the first preset error value is less than the second preset error value.

When the primary remote control determines that the height error information doesn't exceed the first preset error value, the speedup or slowdown command will not be sent, and the primary controller and each secondary controller operate normally.

For example, when the primary remote control controls multiple lifting pedestals 100 to descend by certain height simultaneously:

the primary remote control simultaneously sends the descending command to the primary controller and the secondary controller, and then receives the height change information of the descending of the lifting rod 1 under the control of the primary controller sent by the primary controller. For example, the primary controller can calculate the height change information according to the rotation turns of the motor and the unit transmission stroke in the transmission mechanism or the pitch of the screw rod.

The primary remote control receives the height change information and sends it to each secondary controller, and each secondary controller compares the height change information with the height change value of the descending of the lifting rod under the control of the secondary controller, to obtain the height error information and feeds back the height error information to the primary remote control.

When the primary remote control determines that the absolute value of the height error information exceeds the second preset error value after receiving the height error information, if the height error information is a positive value (the height change information under the control of the primary controller is greater than the height change information under the control of the secondary controller), the primary remote control sends a stop command to the primary controller and then receives the height error information sent by the secondary controller again, and when the primary remote control determines that the height error information is zero, the primary remote control sends a stop command to the secondary controller. On the contrary, if the height error information received by the primary remote control which exceeds the second preset error value is a negative value (the height change information under the control of the primary controller is less than the height change information under the control of the secondary controller), the primary remote control sends a stop command to the secondary controller, and then sends the height change information to the secondary controller for comparison after receiving the height change information sent by the primary controller again, and receives the height error information sent by the secondary controller. The primary remote control sends the stop command to the primary controller when the height error information received again is zero. After the adjustment described above, the user sends a descending command again by the primary remote control according to the difference between the current height of the electric lifting frame and the expected height. The above steps are repeated, the primary remote control sends a stop command to the primary controller and each secondary controller when the height change information received by the primary remote control reaches the preset adjustment height.

When the primary remote control determines that the absolute value of the height error information is less than the second preset error value after receiving the height error information, the height error information is compared with the first preset error value. If the height error information is less than the first preset error value, no command is sent, and the height change information sent by the primary controller and the height error information sent by the secondary remote control are continuously received. When the absolute value of the height error information is less than the second preset error value and greater than the first preset error value, if the height error information is a positive value (the height change information under the control of the primary controller is greater than the height change information under the control of the secondary controller), the primary remote control sends a slowdown command to the primary controller and/or sends a speedup command to the secondary controller; if the height error information is a negative value (the height change information under the control of the primary controller is less than the height change information under the control of the secondary controller), the primary remote control sends a speedup command to the primary controller and/or sends a slowdown command to the secondary controller. The above steps are repeated, the primary remote control sends a stop command to the primary controller and each secondary controller when the height change information received by the primary remote control reaches the preset adjustment height.

The contents described above can be implemented independently or jointly in various ways, and these transformations shall fall into the protection scope of the present disclosure.

It is to be noted that, as used herein, the relational terms such as "first" and "second" are merely used for distinguishing one entity or operation from another entity or operation, but do not necessarily require or imply any actual relationship or order between the entities or the operations. Moreover, the terms "comprise/comprising," "contain/containing," or any other variants thereof are non-exclusive, so that a process, method, object or device containing a series of elements contains not only these elements, but also other elements not listed clearly, or further contains inherent elements of the process, method, object or device. Without more restrictions, an element defined by the statement "comprises an/a . . . " does not exclude other identical elements in the process, method, object or device including this element.

Finally, it is to be noted that the foregoing embodiments are merely used for describing the technical solutions of the present disclosure and not intended to limit the technical solutions of the present disclosure. Although the present disclosure has been described in detail with the foregoing embodiments, it should be understood by a person of ordinary skill in the art that modifications still can be made to the technical solutions described in the foregoing embodiments or equivalent replacements can be made to part of technical features, and these modifications or replacements will not make the essence of the corresponding technical solutions depart from the spirit and scope of the technical solutions in the embodiments of the present disclosure.

What is claimed is:

1. An electric lifting frame comprising:
   a lifting pedestal including:
      a supporting base;
      a lifting rod detachably connected to the supporting base and including a retractable multi-section structure;
      a transmission mechanism provided at the lifting rod;
      a motor provided at the lifting rod and electrically connected to the controller, the motor being configured to effect extension and retraction of the lifting rod via the transmission mechanism;
      a controller provided at the lifting rod and electrically connected to the motor, the controller being configured to control starting and stopping and a rotation direction of the motor; and
      a power supply provided at the lifting rod and configured to supply electric energy to the motor and the controller;
      wherein the controller is further configured to:
         determine a remaining capacity of the power supply; and
         calculate a number of remaining available times of use according to the remaining capacity, a power of the motor, and a stroke of the transmission mechanism, the number of remaining available times of use being a number of times that the remaining capacity supports the motor to drive the transmission mechanism to realize lifting or descending of the lifting rod; and
   a remote control paired with the controller to control the extension and retraction of the lifting rod.

2. The electric lifting frame according to claim 1, wherein:
   the remote control includes a display; and
   the remote control is further configured to:
      receive information indicating the remaining capacity of the power supply and the number of remaining available times of use from the controller; and
      display the information indicating the remaining capacity and the number of remaining available times on the display.

3. The electric lifting frame according to claim 1, wherein the controller includes:
   a storage medium storing data indicating the power of the motor and the stroke of the transmission mechanism, and an identification (ID) of the controller;
   a capacity management circuit configured to determine the remaining capacity of the power supply and calculate the number of remaining available times of use according to the remaining capacity, the power of the motor, and the stroke of the transmission mechanism;
   a pairing circuit configured to pair with the remote control;
   a communication circuit configured to:
      receive pairing information including an ID of the remote control from the remote control;
      send response information including the ID of the controller to the remote control; and send data indicating the remaining capacity and the number of remaining available times of use to the remote control; and a control circuit configured to identify the ID of the remote control carried by the pairing information and control the communication circuit to send the response information to the remote control.

4. The electric lifting frame according to claim 1, wherein the lifting pedestal is a primary lifting pedestal, the controller is a primary controller, and the remote control is a primary remote control;

the electric lifting frame further comprising:
a secondary remote control; and
a secondary pedestal including a secondary controller paired with the secondary remote control;
wherein the primary remote control is further configured to:
send pairing invitation information carrying an identification (ID) of the primary remote control;
receive confirmation information of the secondary remote control carrying an ID of the secondary controller;
identify the ID of the secondary controller;
pair with the secondary controller; and
after paired with the secondary controller, simultaneously control lifting or descending of the primary lifting pedestal and the secondary lifting pedestal.

5. The electric lifting frame according to claim 4, wherein the primary remote control is configured to simultaneously control lifting or descending of the primary lifting pedestal and the secondary lifting pedestal by:

sending, to the primary controller and the secondary controller, a lifting or descending command; and
receiving, from the primary controller, height change information of the lifting or descending of the lifting rod under control of the primary controller;
sending the height change information to the secondary controller;
receiving height error information returned by the secondary controller;
controlling, according to the height error information, a stroke error of the lifting or descending of the lifting rod under control of the primary controller and the secondary controller not to exceed a set value; and
sending to the primary controller and the secondary controller a stop command in response to the height change information indicating a height change of the lifting or descending of the lifting rod reaches a preset adjustment height.

6. The electric lifting frame according to claim 5, wherein controlling, according to the height error information, the stroke error of the lifting or descending of the lifting rod under the control of the primary controller and the secondary controller not to exceed the set value includes:

in response to the height error information indicating a height error exceeds a first preset error value, sending a speedup command to the primary controller and a slowdown command to the secondary controller or sending the slowdown command to the primary controller and the speedup command to the secondary controller; and
in response to the height error information indicating the height error exceeds a second error value, sending a stop command to the primary controller or the secondary controller, the second preset error value being larger than the first preset error value.

7. The electric lifting frame according to claim 1, wherein the controller is further configured to determine a load weight borne by the lifting rod and control a rotation speed of the motor according to the load weight.

8. The electric lifting frame according to claim 1, wherein:
the transmission mechanism includes:
a screw rod, a first end of the screw rod being fixedly connected to an output end of the motor;
a push rod, a first end of the push rod being in transmission connection with a second end of the screw rod, and a second end of the push rod being fixedly connected to a top end of the lifting rod; and
the motor is further configured to effect a spiral transmission between the screw rod and the push rod by driving the screw rod to rotate, and control the push rod to drive the lifting rod to lift or descend.

9. The electric lifting frame according to claim 1, wherein the lifting pedestal further includes a locking mechanism configured to fixedly connecting a top end of the lifting rod to an apparatus to be lifted or descended, the locking mechanism including a fixation frame, a bolt, a pull ring, and an elastic member, wherein:

the fixation frame is fixed on a bottom of the apparatus;
the bolt is in sliding connection with the fixation frame, one end of the bolt being fixedly connected to the pull ring and another end of the bolt is in sliding connection with a top end of the lifting rod; and
the pull ring is elastically connected to the fixation frame by the elastic member, and is configured to be pulled to control the bolt to separate from the top end of the lifting rod.

* * * * *